(12) United States Patent
Tokuhiro et al.

(10) Patent No.: US 10,836,392 B2
(45) Date of Patent: Nov. 17, 2020

(54) VEHICLE SITUATION DETERMINATION DEVICE AND VEHICLE SITUATION DETERMINATION METHOD

(71) Applicant: Panasonic Intellectual Property Management Co., Ltd., Osaka (JP)

(72) Inventors: Takafumi Tokuhiro, Kanagawa (JP); Ichiro Yamane, Kanagawa (JP); Satoshi Fukumoto, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 230 days.

(21) Appl. No.: 16/080,710

(22) PCT Filed: Feb. 13, 2017

(86) PCT No.: PCT/JP2017/005048
§ 371 (c)(1),
(2) Date: Aug. 29, 2018

(87) PCT Pub. No.: WO2017/169182
PCT Pub. Date: Oct. 5, 2017

(65) Prior Publication Data
US 2019/0061764 A1 Feb. 28, 2019

(30) Foreign Application Priority Data
Mar. 28, 2016 (JP) .................. 2016-064529

(51) Int. Cl.
*B60R 21/00* (2006.01)
*B60W 30/08* (2012.01)
(Continued)

(52) U.S. Cl.
CPC ....... *B60W 30/18154* (2013.01); *B60R 21/00* (2013.01); *B60W 30/08* (2013.01);
(Continued)

(58) Field of Classification Search
CPC . B60R 21/00; B60W 30/08; B60W 30/18154; B60W 50/14; B60W 2554/00;
(Continued)

(56) References Cited

U.S. PATENT DOCUMENTS 8,031,085 B1 * 10/2011 Anderson .............. B60Q 5/008
340/425.5
2018/0118106 A1 * 5/2018 You ..................... G06K 9/00791
(Continued)

FOREIGN PATENT DOCUMENTS

| JP | 2009-298193 | 12/2009 |
|----|-------------|---------|
| JP | 2012-238185 | 12/2012 |

OTHER PUBLICATIONS

International Search Report of PCT application No. PCT/JP2017/005048 dated May 16, 2017.

*Primary Examiner* — Robert T Nguyen
(74) *Attorney, Agent, or Firm* — Greenblum & Bernstein, P.L.C.

(57) ABSTRACT

A vehicle situation determination device includes an input unit and a controller. The input unit receives information about a recognition result of recognizing one or a plurality of moving objects existing in a sidewalk region ahead of a vehicle in an advancing direction. The controller determines, based on the recognition result, that the vehicle is allowed to enter a passing scheduled region in a time period of a sparse state when a transition is made from the sparse state into a dense state. The sparse state is a state where density of the one or plurality of moving objects existing in the passing scheduled region is lower than or equal to a predetermined value. The dense state is a state where the density is higher than the predetermined value.

10 Claims, 9 Drawing Sheets

(51) Int. Cl.
    *B60W 30/18*   (2012.01)
    *B60W 50/14*   (2020.01)
    *G05D 1/00*    (2006.01)
    *G06K 9/00*    (2006.01)
    *G08G 1/01*    (2006.01)
    *G08G 1/16*    (2006.01)
    *G05D 1/02*    (2020.01)

(52) U.S. Cl.
    CPC ........... *B60W 50/14* (2013.01); *G05D 1/0088* (2013.01); *G05D 1/0246* (2013.01); *G06K 9/00805* (2013.01); *G08G 1/01* (2013.01); *G08G 1/16* (2013.01); *B60W 2554/00* (2020.02); *G05D 2201/0213* (2013.01)

(58) Field of Classification Search
    CPC ............... G05D 1/0088; G05D 1/0246; G05D 2201/0213; G06K 9/00805; G08G 1/01; G08G 1/16
    See application file for complete search history.

(56) References Cited

U.S. PATENT DOCUMENTS

| | | | |
|---|---|---|---|
| 2018/0326982 A1* | 11/2018 | Paris | B60W 50/0097 |
| 2018/0362034 A1* | 12/2018 | Hirata | B60W 30/0956 |
| 2019/0001884 A1* | 1/2019 | Lopez-Hinojosa | G08G 1/0967 |
| 2019/0056230 A1* | 2/2019 | Hatav | G08G 1/09626 |
| 2020/0074851 A1* | 3/2020 | Mukai | G08G 1/09623 |
| 2020/0114813 A1* | 4/2020 | Lujan | B60W 10/18 |

\* cited by examiner

VEHICLE SITUATION DETERMINATION DEVICE AND VEHICLE SITUATION DETERMINATION METHOD

This application is a U.S. national stage application of the PCT International Application No. PCT/JP2017/005048 filed on Feb. 13, 2017, which claims the benefit of foreign priority of Japanese patent application 2016-064529 filed on Mar. 28, 2016, the contents all of which are incorporated herein by reference.

TECHNICAL FIELD

The present disclosure relates to a vehicle situation determination device, a vehicle situation determination method, and a vehicle situation determination program that determines a situation of a vehicle trying to cross a sidewalk region.

BACKGROUND ART

In recent years, in relation to practical applications of driving assist, autonomous driving vehicles, and the like, a technique for autonomously determining a situation of a vehicle is under development. For example, Patent Literature 1 discloses a technique for acquiring external information representing a situation of other vehicles in an intersection to determine a risk level of a vehicle based on the acquired information. Such a conventional technique makes it possible to determine the risk level of the vehicle in an intersection and to suitably take a countermeasure to reduce the risk.

CITATION LIST

Patent Literature

PTL 1: Unexamined Japanese Patent Publication No. 2009-298193

SUMMARY OF THE INVENTION

However, a vehicle situation to be determined includes various things other than the risk of a vehicle in an intersection. For example, a vehicle tries to cross a sidewalk where a lot of pedestrians are walking, from a parking lot to a road. In this case, when a situation is determined that the vehicle can cross the sidewalk quickly (namely, smoothly) while safety of pedestrians is being secured, convenience of the vehicle can be improved. Therefore, a technique is needed for a situation determination to improve smooth movement of a vehicle across an area such as a sidewalk or a side strip (hereinafter, "a sidewalk region").

It is an object of the present disclosure to provide a vehicle situation determination device, a vehicle situation determination method, and a vehicle situation determination program that can improve a smooth movement of a vehicle across a sidewalk region.

A vehicle situation determination device of the present disclosure includes an input unit that receives a recognition result from a recognition device that recognizes one or a plurality of moving objects existing in a sidewalk region across which a vehicle tries to move. Further, the vehicle situation determination device includes a controller that determines, based on the recognition result, that the vehicle is allowed to enter a passing scheduled region in a time period of a sparse state when a transition is made from the sparse state into a dense state. The sparse state is a state where density of the one or plurality of moving objects existing in the passing scheduled region is lower than or equal to a predetermined value. The dense state is a state where the density is higher than the predetermined value.

A vehicle situation estimation method of the present disclosure includes receiving a recognition result from a recognition device that recognizes one or a plurality of moving objects existing in a sidewalk region across which a vehicle tries to move. Further, the method includes determining, based on the recognition result, that the vehicle is allowed to perform an entry notification operation for notifying the one or plurality of moving objects of a high possibility of entry of the vehicle into a passing scheduled region in a time period of a sparse state when a determination is made that a transition is made from the sparse state into a dense state, and outputting a predetermined control signal. The sparse state is a state where density of the one or plurality of moving objects existing in the passing scheduled region is lower than or equal to a predetermined value. The dense state is a state where the density is higher than the predetermined value.

A vehicle situation determination program of the present disclosure causes a computer to execute processing for receiving a recognition result from a recognition device that recognizes one or a plurality of moving objects existing in a sidewalk region across which a vehicle tries to move. Further, the program causes the computer to determine, based on the recognition result, that the vehicle is allowed to perform an entry notification operation for notifying the one or plurality of moving objects of a high possibility of entry of the vehicle into a passing scheduled region in a time period of a sparse state when a determination is made that a transition is made from the sparse state into a dense state, and to output a predetermined control signal. The sparse state is a state where density of the one or plurality of moving objects existing in the passing scheduled region is lower than or equal to a predetermined value. The dense state is a state where the density is higher than the predetermined value.

The present disclosure can improve smooth movement of a vehicle across a sidewalk region.

DESCRIPTION OF EMBODIMENT

Hereinafter, an exemplary embodiment of the present disclosure will be described in detail with reference to the drawings.

Overview of Device

First, a use environment of a vehicle situation determination device according to the present exemplary embodiment and an overview of functions exhibited by the device in such an environment will be described.

Figure 1:
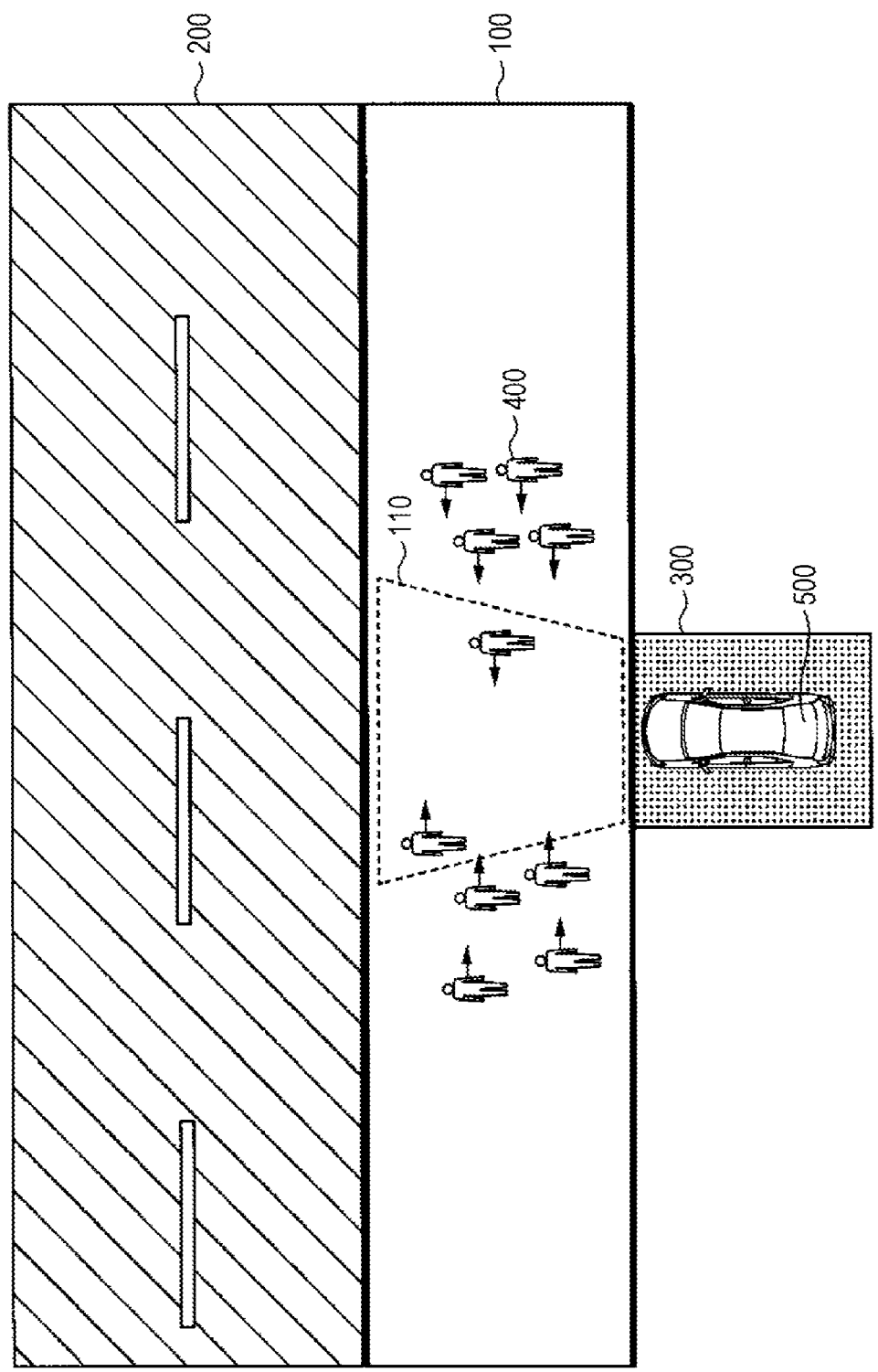
FIG. 1 is a first diagram illustrating one example of a use environment of a vehicle situation determination device according to a present exemplary embodiment.
Figure 2:
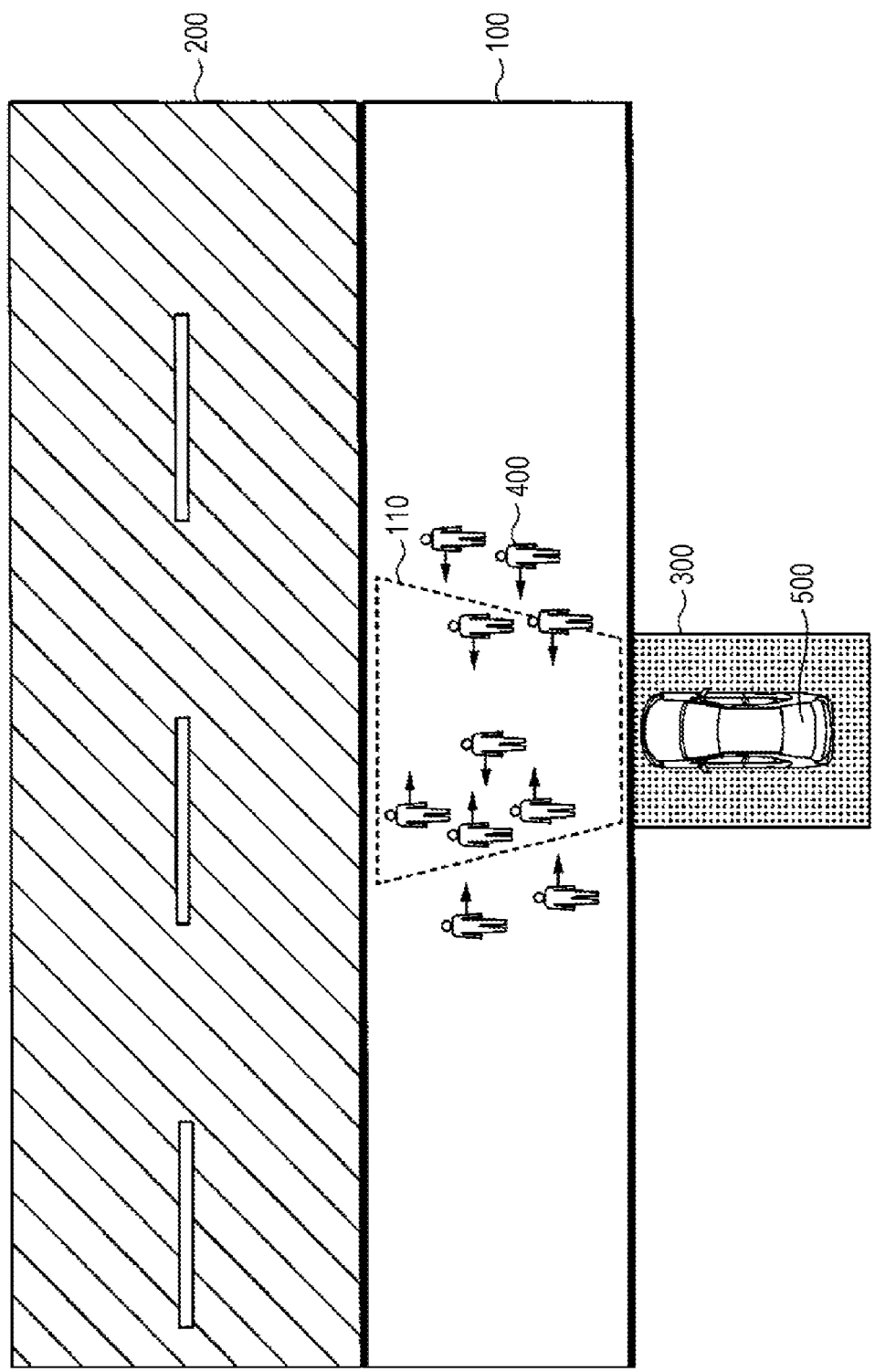
FIG. 2 is a second diagram illustrating one example of the use environment of the vehicle situation determination device according to the present exemplary embodiment.

FIG. 1 and FIG. 2 are diagrams illustrating examples of the use environment of the vehicle situation determination device according to the present exemplary embodiment.

As illustrated in FIG. 1, there exist sidewalk region 100, roadway region 200 located adjacent to one side of sidewalk region 100, and stopping region 300 located adjacent to the other side of sidewalk region 100. Sidewalk region 100 is a region, such as a sidewalk, a side strip, and a cycle road, where moving objects 400, such as a pedestrian, a bicycle, and a wheelchair mainly pass through. Roadway region 200 is a region such as a roadway where automobiles mainly pass through. Stopping region 300 is a region where vehicle 500, such as an automobile trying to enter roadway region 200 by crossing sidewalk region 100, stops immediately before starting crossing. Stopping region 300 is, for example, a parking lot.

A region that vehicle 500 will pass after crossing sidewalk region 100, including its vicinity is defined as passing scheduled region 110. Passing scheduled region 110 is a region where it is desirable that moving objects 400 do not exist at least when vehicle 500 departs from stopping region 300. In addition, passing scheduled region 110 is a region determined based on moving speeds of vehicle 500 and each moving object 400 and a safe distance to be secured between vehicle 500 and each moving object 400.

Note that, passing scheduled region 110, for example, has a shape in which a width becomes wider with the increase of distance from stopping region 300. This is because a time elapses while vehicle 500 crosses sidewalk region 100, and moving objects 400 move during the lapse of time and get closer to vehicle 500. However, the shape and size of passing scheduled region 110 are not limited to an example illustrated in FIG. 1 or the like.

As illustrated in FIG. 1, when moving objects 400 exist in passing scheduled region 110, it is not preferable that vehicle 500 enters passing scheduled region 110 from a viewpoint that the safety of moving objects 400 is secured. However, when vehicle 500 stops and waits in stopping region 300, as illustrated in FIG. 2, new moving objects 400 enter passing scheduled region 110. Vehicle 500 is then brought to a standstill in stopping region 300 until all moving objects 400 leave passing scheduled region 110. Such a standstill time may be very long depending on a situation of sidewalk region 100.

Thus, in order to improve such a situation, the vehicle situation determination device according to the present exemplary embodiment is mounted in vehicle 500. Such a vehicle situation determination device determines the situation of vehicle 500 to exhibit a function for improving smooth (namely, rapid while the safety of moving objects 400 is secured) moving of vehicle 500 across sidewalk region 100.

Figure 3:
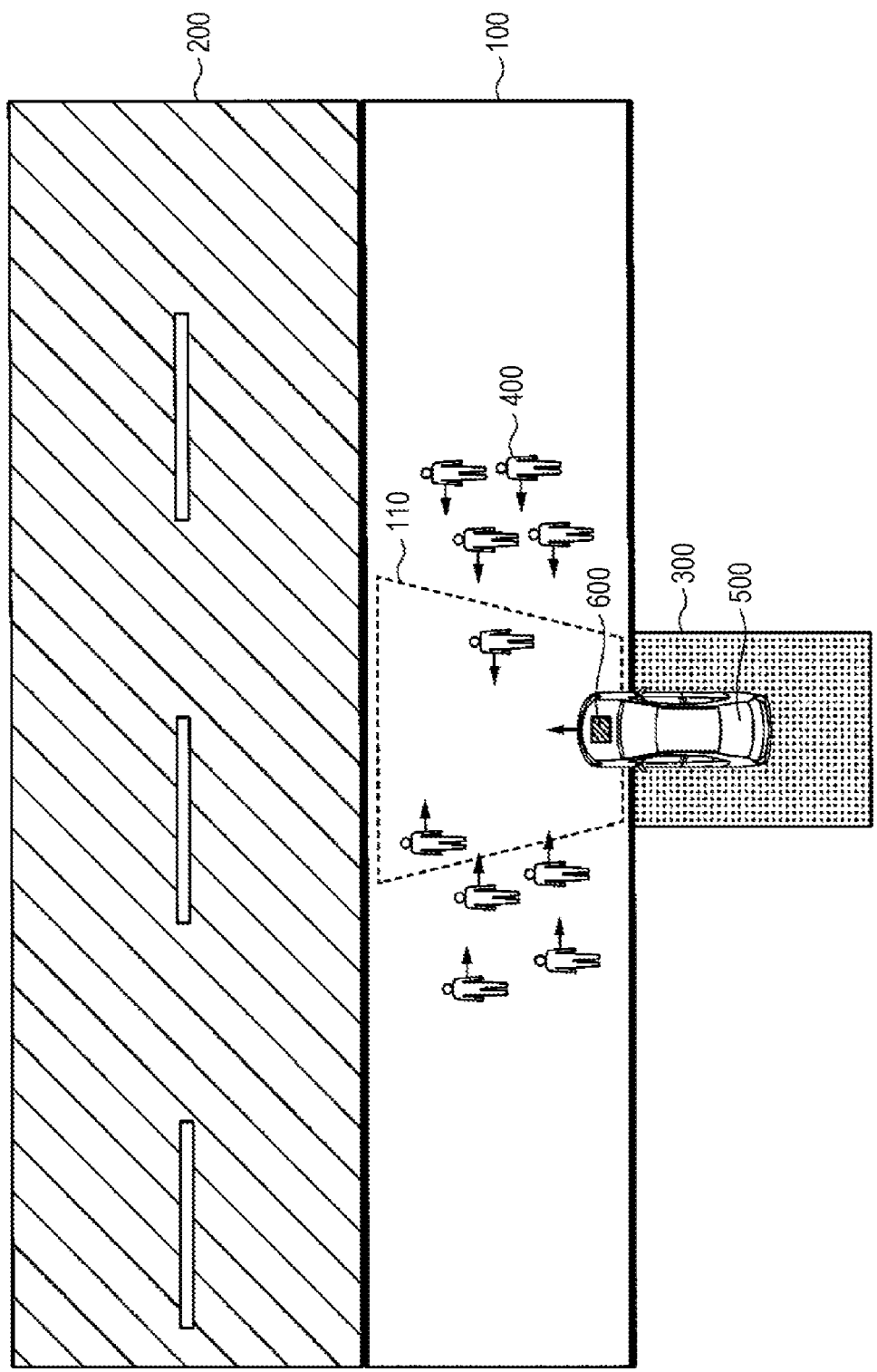
FIG. 3 is a first diagram illustrating one example of a function of the vehicle situation determination device according to the present exemplary embodiment.
Figure 4:
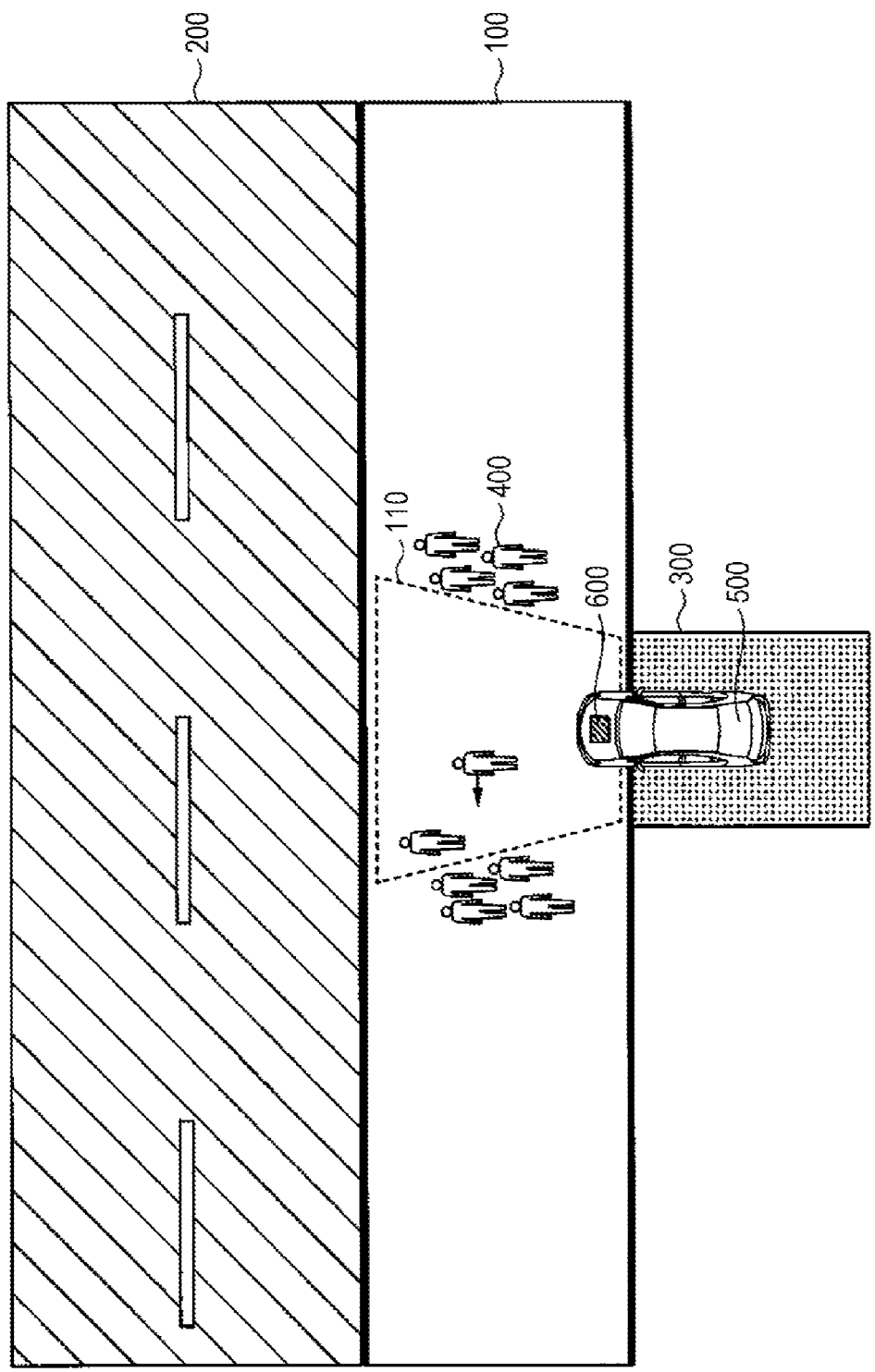
FIG. 4 is a second diagram illustrating one example of the function of the vehicle situation determination device according to the present exemplary embodiment.

FIG. 3 and FIG. 4 are diagrams illustrating examples of functions of the vehicle situation determination device.

As illustrated in FIG. 3, vehicle situation determination device 600 according to the present exemplary embodiment is a device mounted in vehicle 500. Vehicle situation determination device 600 is, for example, a device communicably connected to an electronic controller (ECU, not illustrated) of vehicle 500 or a device built in the ECU.

Vehicle situation determination device 600 determines a time period of a sparse state where moving objects 400 exist in passing scheduled region 110 but density of moving objects 400 in this region is less than or equal to a predetermined value (hereinafter, a "sparse time period") when vehicle 500 continues waiting in stopping region 300. Further, vehicle situation determination device 600 determines a time period of a dense state where the density of moving objects 400 in passing scheduled region 110 is higher than the predetermined value (hereinafter, a "dense time period") when vehicle 500 continues waiting in stopping region 300. Vehicle situation determination device 600 then determines whether a transition from the sparse state into the dense state is made, namely, whether a time period during which the dense time period comes after the sparse time period (hereinafter, a "sequential-sparse-and-dense time period") comes when vehicle 500 continues waiting in stopping region 300.

FIG. 1 illustrates one example of the state of sidewalk region 100 in the sparse time period. FIG. 2 illustrates one example of the state of sidewalk region 100 in the dense time period just after the sparse time period. Vehicle situation determination device 600 estimates whether, at a time of, for example, the state illustrated in FIG. 1, a transition is made from the state illustrated in FIG. 1 to the state illustrated in FIG. 2 just after a current time, based on a layout of moving objects 400 in sidewalk region 100. Vehicle situation determination device 600 then determines that the sequential-sparse-and-dense time period is coming when the state transition is estimated to be made.

The sequential-sparse-and-dense time period is said to be coming in both cases when the density of moving objects 400 is low at current time and then becomes high after that, and when the density is high at current time and then becomes low once and then becomes high after that.

When it is determined that the sequential-sparse-and-dense time period is coming, as illustrated in FIG. 3, in the sparse time period of the sequential-sparse-and-dense time period, vehicle situation determination device 600 causes vehicle 500 to enter passing scheduled region 110 by a predetermined distance (for example, 50 cm).

The entry of vehicle 500 causes each of moving objects 400 to easily recognize that a driver of vehicle 500 intends to enter passing scheduled region 110 or that vehicle 500 that autonomously travels has determined to enter passing scheduled region 110. That is, the entry operation notifies moving objects 400 that vehicle 500 is likely to enter passing scheduled region 110. Such a notification urges moving objects 400 to stop and wait for vehicle 500 to cross, and to positively leave passing scheduled region 110.

As a result, after the sparse time period, when the waiting continues, as illustrated in FIG. 2, a transition is being made into a state where many moving objects 400 exist in passing scheduled region 110. As illustrated in FIG. 4, a transition is made into a state where a small number of moving objects 400 exist so that vehicle 500 is allowed to pass.

Configuration of Device

A configuration of vehicle situation determination device 600 will be described below.

Figure 5:
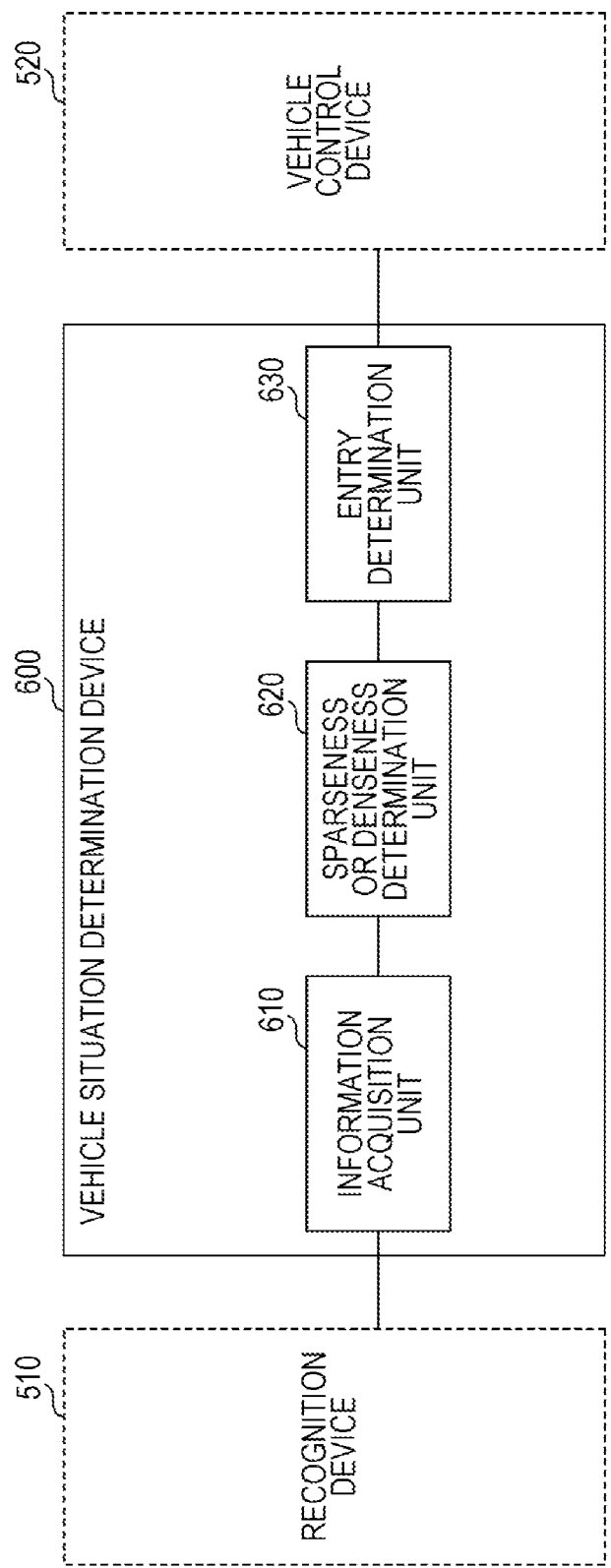
FIG. 5 is a block diagram illustrating one example of a configuration of the vehicle situation determination device according to the present exemplary embodiment.

FIG. 5 is a block diagram illustrating one example of the configuration of vehicle situation determination device 600. Note that, in FIG. 5, a configuration of a periphery of vehicle situation determination device 600 will be also illustrated.

In FIG. 5, vehicle situation determination device 600 includes information acquisition unit 610, sparseness/denseness determination unit 620, and entry determination unit 630.

Information acquisition unit 610 acquires information indicating arrangement of one or a plurality of moving objects 400 existing in sidewalk region 100 (hereinafter referred to as "sidewalk information"), and outputs the acquired sidewalk information to sparseness/denseness determination unit 620. Note that, the sidewalk information preferably indicates locations, moving directions, and moving speeds of moving objects 400 at least at the current or past time for each of moving objects 400 existing in sidewalk region 100.

Information acquisition unit 610 acquires, for example, information output from recognition device 510 mounted in vehicle 500 as the sidewalk information. Recognition device 510 includes sensors, such as a millimeter-wave radar, a camera, or a sonar, that detects moving objects 400 and outputs a detected result, and/or a communication device that acquires position information about moving objects 400, such as a dynamic map, from a system that manages the position information and outputs the position information. That is, as an acquisition method for the sidewalk information in information acquisition unit 610, a publicly-known moving object (pedestrian) detection technique or a moving object (pedestrian) distribution acquisition technique can be adopted.

Sparseness/denseness determination unit 620 determines, based on the sidewalk information, whether the above-described sequential-sparse-and-dense time period is coming when vehicle 500 continues waiting in stopping region 300 to notify entry determination unit 630 of a determined result. Details of the determination method will be described later.

Entry determination unit 630 determines that the sequential-sparse-and-dense time period is coming and that an entry notification operation is performable under a condition that a stopping time of vehicle 500 exceeds a first threshold (for example, 1 minute). Herein, the stopping time is a length of a time during which vehicle 500 waits for entering passing scheduled region 110 because of moving objects 400 existing in passing scheduled region 110. For example, the stopping time is acquired through the measurement or estimation by sparseness/denseness determination unit 620. Details of a stopping time acquisition method will be described later. Further, the entry notification operation is an operation for notifying moving objects 400 that vehicle 500 is likely to enter passing scheduled region 110 in the sparse time period of the sequential-sparse-and-dense time period.

The entry notification operation includes, for example, an operation such that vehicle 500 enters passing scheduled region 110 by a predetermined distance in the sparse time period of the sequential-sparse-and-dense time period (hereinafter, an "entry starting operation"). In this case, entry determination unit 630 generates a control signal that instructs the entry starting operation to vehicle 500 under the condition that the entrance starting operation is performable, and outputs the signal to vehicle control device 520 mounted in vehicle 500. Vehicle control device 520 is, for example, a device that controls autonomous driving including at least autonomous forward movement of vehicle 500.

Note that, vehicle control device 520 does not perform the entry starting operation in a case of having determined not to perform the entry starting operation based on another determination criterion (for example, in a case where there is a possibility of minor collision with moving object 400), even in a case of having received the control signal that instructs the entry starting operation.

Note that, information acquisition unit 610 described above can be regarded as an input unit that receives a recognition result from recognition device 510 that recognizes one or a plurality of moving objects 400 existing in sidewalk region 100 across which vehicle 500 tries to move. Further, sparseness/denseness determination unit 620 and entry determination unit 630 can be regarded as controllers that determines that the entry notification operation is performable and that outputs a predetermined control signal, when determining that a transition is made from the sparse state into the dense state based on a recognition result.

Further, vehicle situation determination device 600, not illustrated, for example, has a central processing unit (a CPU), a storage medium, such as a read only memory (a ROM) storing a control program, a working memory, such as a random access memory (a RAM), and a communication circuit. In this case, a function of each unit described above is achieved by the CPU executing the control program.

When the sequential-sparse-and-dense time period is coming, vehicle situation determination device 600 determines that the entry notification operation is performable. Thus in the sparse time period of the sequential-sparse-and-dense time period, vehicle 500 is allowed to enter passing scheduled region 110 by a predetermined distance.

Method for Determining Sequential-Sparse-and-Dense Time Period

Herein, the above-described method for determining whether the sequential-sparse-and-dense time period is coming when vehicle 500 continues waiting in stopping region 300, to be executed by sparseness/denseness determination unit 620, will be described.

Figure 6:
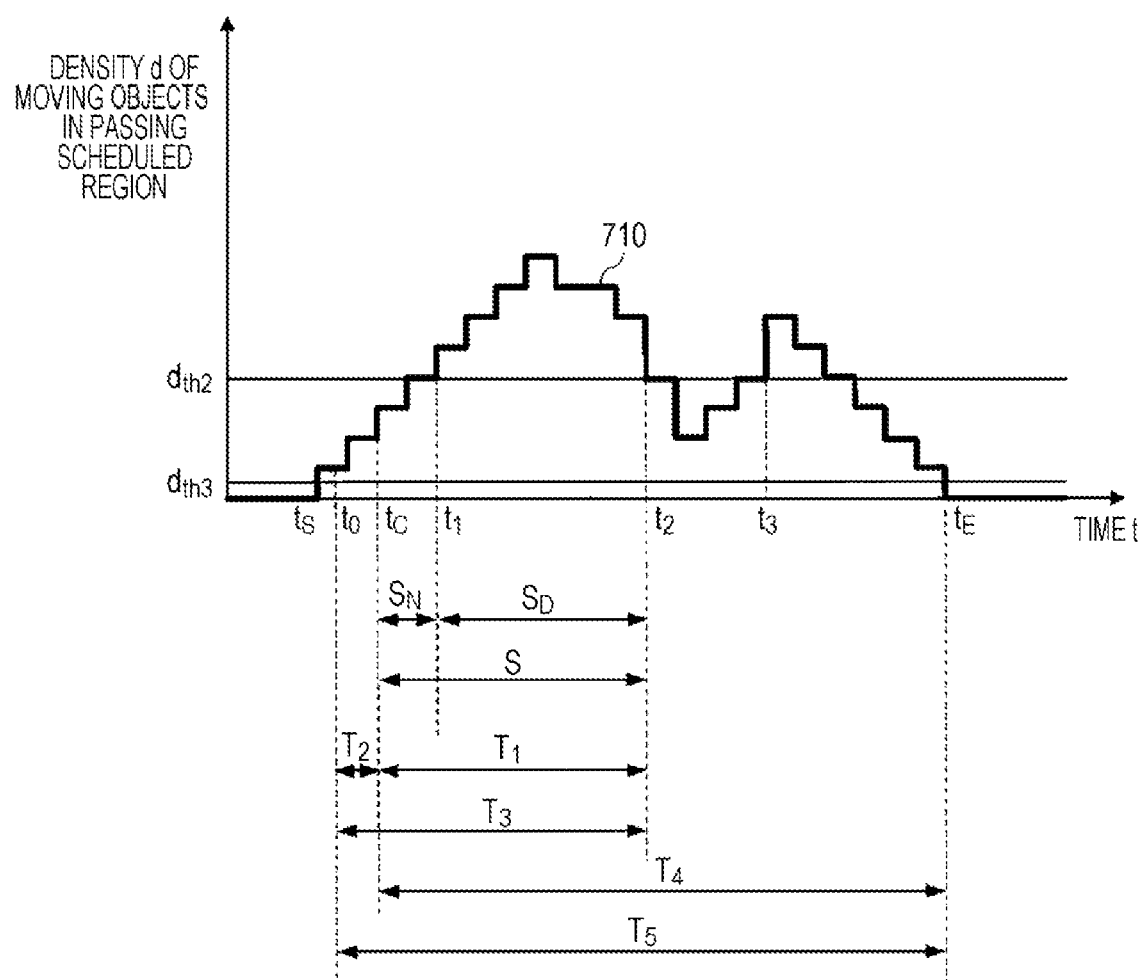
FIG. 6 is a diagram for describing one example of a method for determining a sequential-sparse-and-dense time period according to the present exemplary embodiment.

FIG. 6 is a diagram for describing one example of the method for determining the sequential-sparse-and-dense time period. In FIG. 6, a lateral axis represents time t, and a vertical axis represents density d of moving objects 400 in passing scheduled region 110.

Density d of moving objects 400 in passing scheduled region 110 is, for example, a number of moving objects 400 existing in passing scheduled region 110 or an average value of the number of moving objects 400 in passing scheduled region 110 per unit area (for example, 1 $m^2$). Herein, the unit area in the latter case may partially varies so as to be, for example, larger in a portion closer to stopping region 300 and smaller in a portion farther from stopping region 300.

The number of moving objects 400 per unit area can be obtained, for example, by counting the number of moving objects 400 located in each of a plurality of partitions obtained by partitioning sidewalk region 100 in a matrix such that one partition has a unit area.

Sparseness/denseness determination unit 620 calculates positions of moving objects 400 (estimated positions of moving destinations) at least at times t after a current time tC, based on positions, moving directions, and moving speeds of moving objects 400 indicated by the sidewalk information. Sparseness/denseness determination unit 620 calculates density d of moving objects 400 in passing scheduled region 110 from a relationship between the estimated positions of moving objects 400 calculated at each time t and passing scheduled region 110, and estimates a time change in density d indicated by thick line 710.

Density d of moving objects 400 in passing scheduled region 110 changes with elapse of time t according to the movement of moving objects 400 as indicated by thick line 710. Like examples illustrated in FIG. 1 and FIG. 2, when flows of two moving objects 400 that enter passing scheduled region 110 from both sides intersect in passing scheduled region 110, density d starts to increase from 0 at time tS and returns to 0 at time $t_E$ as indicated by thick line 710. During this time, density d exceeds predetermined second threshold dth2 (for example, a value corresponding to 0.2 person/m$^2$), for example, at first time $t_1$, becomes slightly below second threshold dth2 at second time $t_2$, and again exceeds second threshold dth2 at third time $t_3$.

Sparseness/denseness determination unit 620 determines whether there exists any section that is after current time $t_C$ and where density d at each time t exceeds second threshold dth2 (for example, a value corresponding to 0.2 person/m$^2$). Sparseness/denseness determination unit 620 then determines an earliest section (first time t1 to second time t2) in the corresponding section as dense time period SD.

Further, sparseness/denseness determination unit 620 determines whether there exists any section that is after current time $t_C$, that is sequential with the determined dense time period SD before the dense time period SD, and that has density d greater than or equal to third threshold dth3 which is larger than 0 (for example, a value corresponding to 0.02 person/m$^2$) and less than or equal to second threshold dth2. Sparseness/denseness determination unit 620 then determines a corresponding section (current time $t_C$ to first time $t_1$) as sparse time period $S_N$.

Sparseness/denseness determination unit 620 then determines a time period including sparse time period $S_N$ and dense time period SD following sparse time period $S_N$ (current time $t_C$ to second time $t_2$) as sequential-sparse-and-dense time period S.

Note that, in the present exemplary embodiment, current time $t_C$ may be a (future) time later than an exact current time by a predetermined time. Such a predetermined time is, for example, a time required for vehicle 500 to complete a movement by a predetermined distance after information acquisition unit 610 acquires the information.

Further, second and third thresholds dth2, dth3 may be, as described later, values that change according to a stopping time and the like.

Stopping Time Acquisition Method

A stopping time acquisition method will be described below with reference to FIG. 6.

The stopping time is a length of a time during which vehicle 500 waits for entering passing scheduled region 110 because, as described above, moving objects 400 exist in passing scheduled region 110. The stopping time is a parameter to be used for determining whether the entry notification operation is performable.

As the stopping time, various times can be adopted according to whether a waiting time until current time $t_C$ is taken into consideration, whether a time before start of crossing of vehicle 500 is determined (before waiting is started) is taken into consideration, and whether the sparse time period that comes after the second one (second time $t_2$ to third time $t_3$) is taken into consideration.

For example, as the stopping time, the following times can be adopted. Note that, the waiting start time $t_0$ is, for example, a time when vehicle 500 can depart from stopping region 300, and a time when moving objects 400 starts existing in passing scheduled region 110 before the sequential-sparse-and-dense time period S.

(1) Time $T_1$ between current time $t_C$ that is a start time of sparseness/denseness continuous time period S and second time $t_2$ that is an end time of sequential-sparse-and-dense time period S.

(2) Time $T_2$ between waiting start time t0 when vehicle 500 starts waiting for entering passing scheduled region 110 and current time $t_C$.

(3) Time $T_3$ between waiting start time $t_0$ and second time $t_2$ that is the end time of sequential-sparse-and-dense time period S.

(4) Time $T_4$ between current time $t_C$ that is the starting time of sequential-sparse-and-dense time period S and end time $t_E$ of a time period during which density d continues being more than or equal to third threshold dth2.

(5) Time $T_5$ between waiting start time $t_0$ and end time $t_E$ of the time period during which density d continues being more than or equal to third threshold dth2.

Times $T_1$, $T_4$ can be obtained by estimation, time $T_2$ can be obtained by measurement, and times $T_3$, $T_5$ can be obtained by measurement and estimation.

Entry determination unit 630 does not determine that the entry notification operation is performable when, as described above, the stopping time is short. Therefore, vehicle situation determination device 600 can realize smooth passage of moving objects 400 in sidewalk region 100 and smooth crossing of the vehicle in a balanced manner.

Note that, sparseness/denseness determination unit 620 may first obtain time $T_4$ or time $T_5$ as the stopping time, and may change second threshold dth2 according to the stopping time. For example, sparseness/denseness determination unit 620 adopts second threshold dth2 of a smaller value as the stopping time is longer. This can achieve smooth passage of moving objects 400 and smooth crossing of the vehicle in a better balanced manner.

Operation of Device

An operation of the vehicle situation determination device will be described below.

Figure 7:
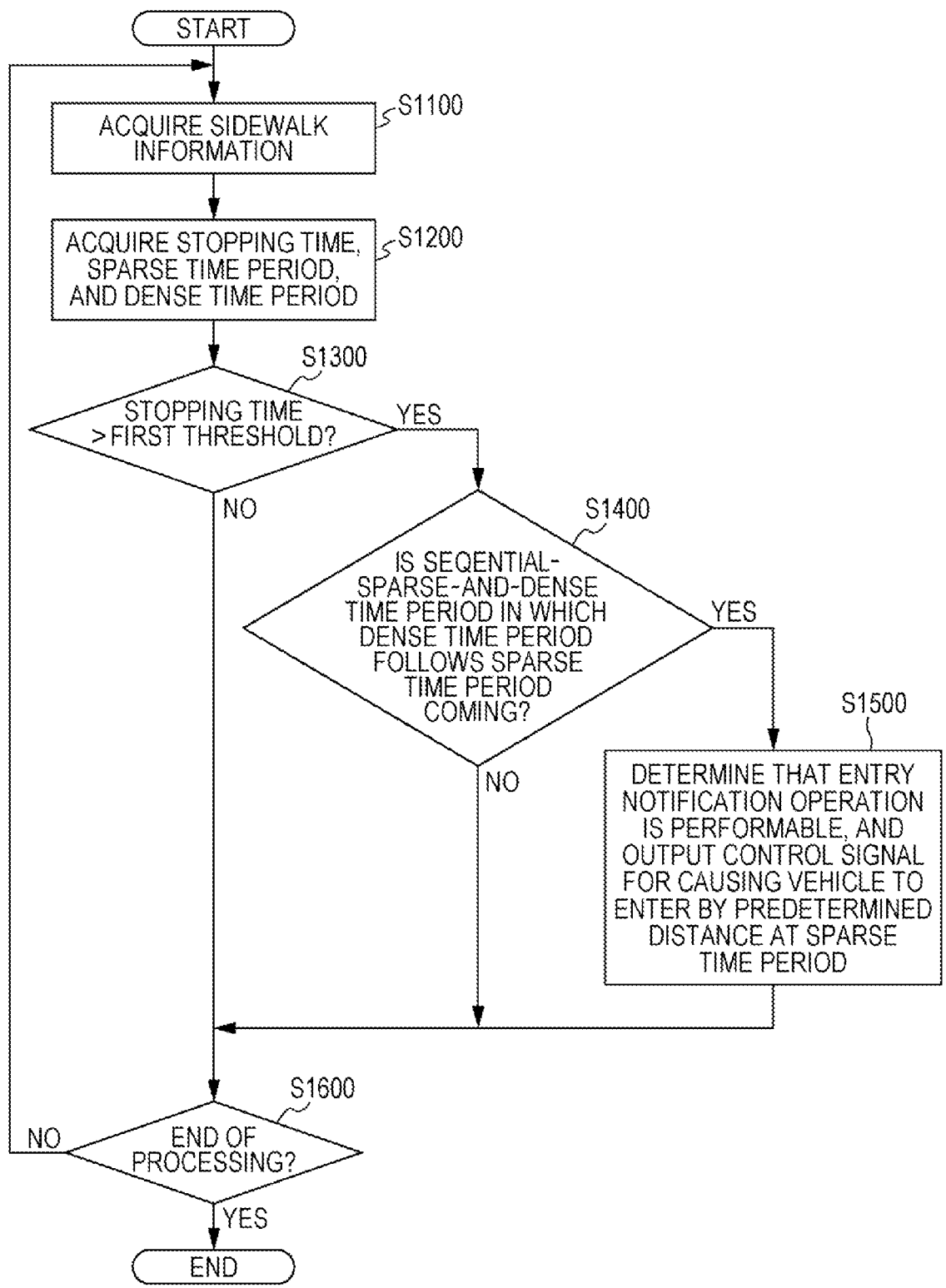
FIG. 7 is a flowchart illustrating one example of an operation of the vehicle situation determination device according to the present exemplary embodiment.

FIG. 7 is a flowchart illustrating one example of the operation of vehicle situation determination device 600. Vehicle situation determination device 600, for example, performs an operation described below while vehicle 500 is located in stopping region 300. Passing scheduled region 110 described above is, for example, set by sparseness/denseness determination unit 620, based on a location and a direction of vehicle 500 in stopping region 300. In addition, whether vehicle 500 tries to cross sidewalk region 100 is, for example, determined in information acquisition unit 610 by acquisition and analysis of map information indicating a surrounding environment of vehicle 500, vehicle information indicating an operating state of vehicle 500, and sidewalk information.

Note that, vehicle situation determination device 600 can grasp a region where vehicle 500 is located as new stopping region 300 at each time point from start until end of movement of vehicle 500 across sidewalk region 100. Vehicle situation determination device 600 can also grasp a remaining region of passing scheduled region 110 located ahead of vehicle 500 as new passing scheduled region 110.

In this case, vehicle situation determination device 600 performs, for example, an operation described below until vehicle 500 completes crossing of sidewalk region 100.

In step S1100, information acquisition unit 610 acquires the sidewalk information.

In step S1200, sparseness/denseness determination unit 620 acquires (including measurement and estimation) the stopping time, the sparse time period, and the density time period of vehicle 500. Note that, sparseness/denseness determination unit 620 may, as described above, determine second threshold dth2 (see FIG. 6) based on the acquired stopping time.

In step S1300, entry determination unit 630 determines whether the stopping time of vehicle 500 exceeds the first threshold. If the stopping time is less than or equal to the first threshold (NO in step S1300), entry determination unit 630 proceeds to processing in step S1600 described below. Further, if the stopping time exceeds the first threshold (YES in step S1300), entry determination unit 630 proceeds to processing in step S1400.

In step S1400, sparseness/denseness determination unit 620 determines, based on the acquired sidewalk information, whether the sequential-sparse-and-dense time period S in which dense time period SD follows sparse time period SN is coming (see FIG. 6). If the sequential-sparse-and-dense time period S is coming (YES in S1400), sparseness/denseness determination unit 620 proceeds to the processing in step S1500. Further, if sequential-sparse-and-dense time period S is not coming (NO in S1400), sparseness/denseness determination unit 620 proceeds to processing in step S1600.

In step S1500, entry determination unit 630 determines that the entry notification operation is performable, and outputs a control signal for causing vehicle 500 to enter by a predetermined distance in sparse time period SN in sequential-sparse-and-dense time period S that is coming (see FIG. 6).

Then, in step S1600, information acquisition unit 610 determines whether end of processing has been instructed by a user operation or the like. If end of processing is not instructed (NO in S1600), information acquisition unit 610 returns to processing in step S1100. If end of processing has been instructed (YES in S1600), information acquisition unit 610 ends a series of processing.

According to such an operation, vehicle situation determination device 600 can successively determine whether the stopping time exceeds the threshold and whether the sequential-sparse-and-dense time period in which the dense time period follows the sparse time period is coming. Further, vehicle 500 can be caused to enter passing scheduled region 110 at suitable timing.

Note that, an order of each processing is not limited to the above example. For example, processing in steps S1300 and S1400 may be performed in the reverse order.

As to passage or transfer of a line on a one-way sidewalk, many moving objects 400 located in sidewalk region 100 move together in an approximately uniform direction and at an approximately uniform speed.

In such a case, sparseness/denseness determination unit 620 may detect a dense region of moving objects 400 based on the sidewalk information, and may determine a time period during which the dense region passes through passing scheduled region 110 when vehicle 500 continues waiting, as the dense time period. Sparseness/denseness determination unit 620 then may detect the sparse region of moving objects 400 based on the sidewalk information, and may determine a time period during which the sparse region passes through passing scheduled region 110 when vehicle 500 continues waiting, as the sparse time period.

The dense region is, for example, a closed region where a number of moving objects 400 per predetermined area (density) in sidewalk region 100 exceeds the second threshold, and a region moving toward passing scheduled region 110. Further, the sparse region is, for example, a closed region where a number (density) of moving objects 400 per predetermined area in sidewalk region 100 is more than or equal to the third threshold larger than 0 and less than or equal to the second threshold, and the closed region moves together with the dense region continuously with the dense region on a side closer to passing scheduled region 110.

Further, passage through passing scheduled region 110 means that moving objects 400 occupy passing scheduled region 110, that moving objects 400 occupy an area of a predetermined rate or more in passing scheduled region 110, or that moving objects 400 reach passing scheduled region 110.

Figure 8:
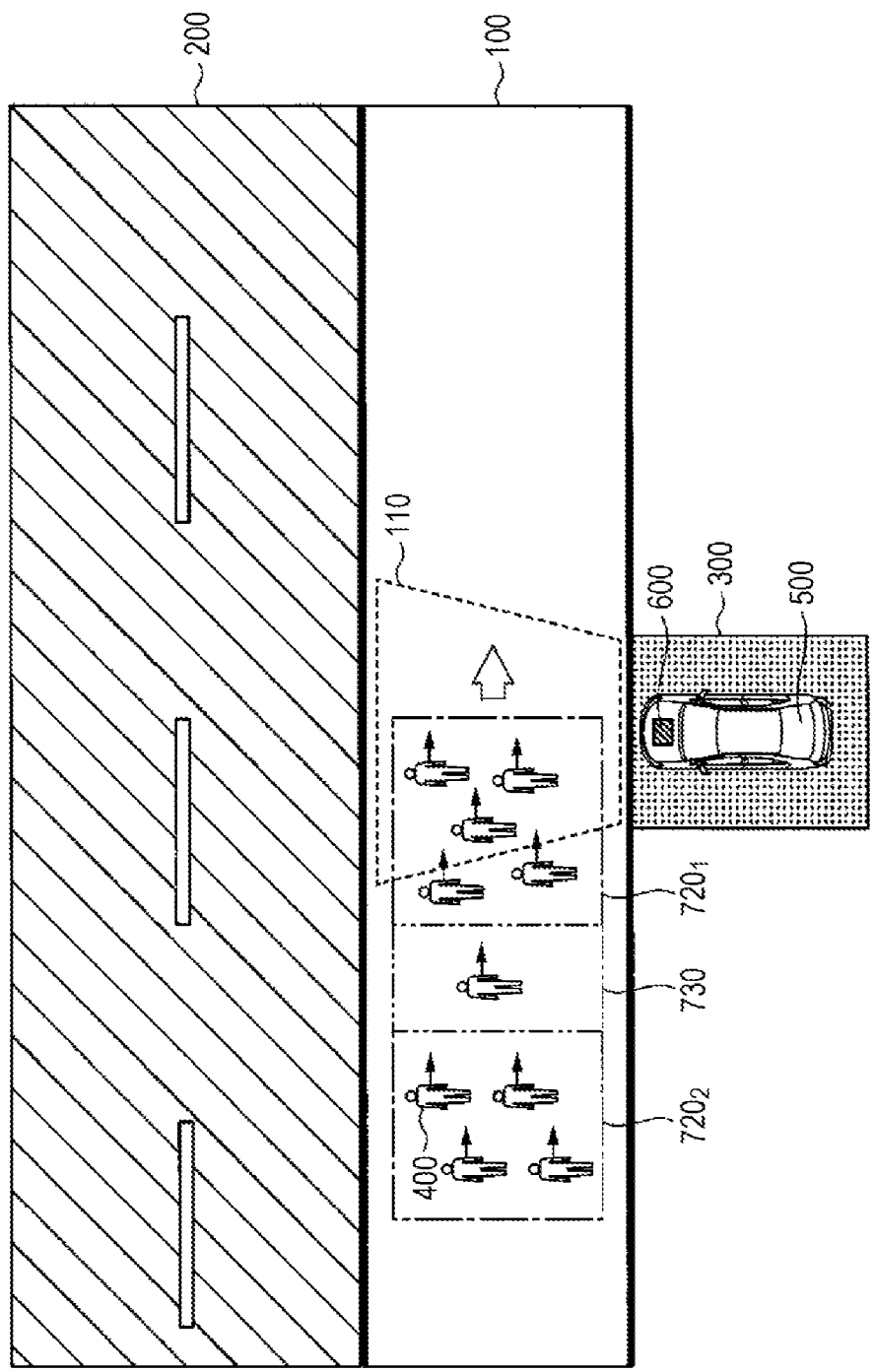
FIG. 8 is a third diagram illustrating one example of a function of the vehicle situation determination device according to the present exemplary embodiment.
Figure 9:
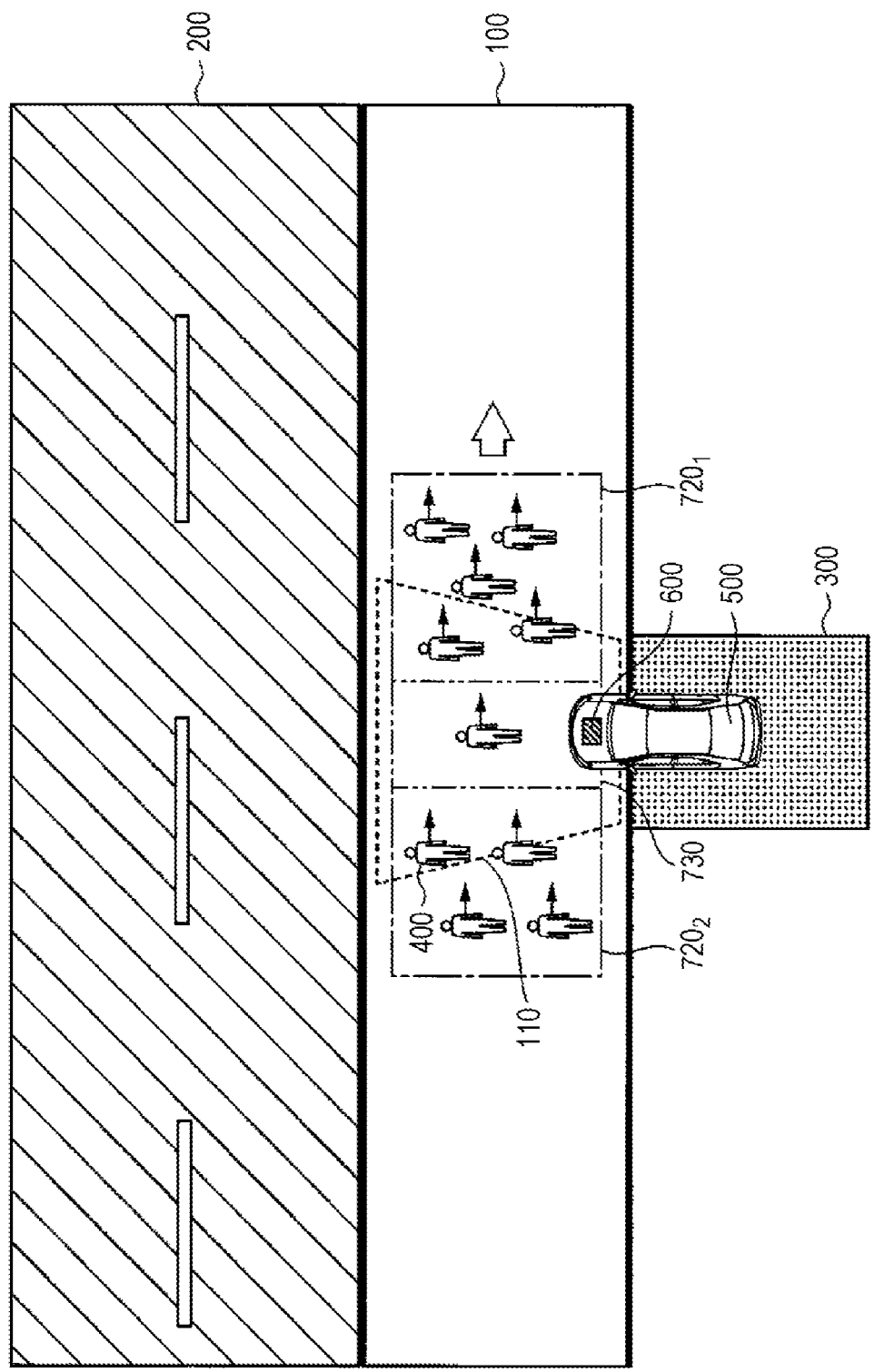
FIG. 9 is a fourth diagram illustrating one example of a function of the function of the vehicle situation determination device according to the present exemplary embodiment.

FIG. 8 and FIG. 9 are diagrams illustrating examples of functions of vehicle situation determination device 600 in a case where a plurality of moving objects moves together.

As illustrated in FIG. 8, a group including first dense region 7201, sparse region 730, and second dense region 7202 is supposed to move toward passing scheduled region 110 sequentially in this order. A certain length of a time is required until the passage of the group through passing scheduled region 110 is completed.

For example, with timing that first dense region 7201 reaches passing scheduled region 110 as illustrated in FIG. 8, sparseness/denseness determination unit 620 specifies time periods during which first dense region 7201, sparse region 730, and second dense region 7202 pass through passing scheduled region 110 when vehicle 500 continues waiting based on the sidewalk information. Sparseness/denseness determination unit 620 then determines the specified time periods as the first dense time period, the sparse time period, and the second dense time period. Since the second dense time period follows the sparse time period, sparseness/denseness determination unit 620 determines the sparse time period and the second dense time period (the time periods during which sparse region 730 and second dense region 7202 pass through passing scheduled region 110), as the sequential-sparse-and-dense time period that is to come.

Therefore, entry determination unit 630 outputs a control signal for causing vehicle 500 to advance for example, with timing, as illustrated in FIG. 9, that sparse region 730 is located in passing scheduled region 110 (namely, the sparse time period).

Such entry of vehicle 500 enables moving objects 400 to easily recognize that a driver of vehicle 500 intends to enter passing scheduled region 110 or that vehicle 500 that autonomously travels decides to enter passing scheduled region 110. As a result, moving objects 400 temporarily stop to wait for crossing of vehicle 500 or leave passing scheduled region 110.

Effects of the Present Exemplary Embodiment

As described above, vehicle situation determination device 600 according to the present exemplary embodiment includes an input unit (information acquisition unit 610) that receives a recognition result from recognition device 510 that recognizes one or a plurality of moving objects 400 existing in sidewalk region 100 across which vehicle 500 moves. Further, vehicle situation determination device 600 includes a controller (sparseness/denseness determination unit 620, entry determination unit 630) that determines that the entry notification operation is performable when determining, based on the recognition result, that a transition is made from the sparse state into the dense state to output a predetermined control signal. Note that, the sparse state is a state where the density of moving objects 400 in passing scheduled region 110 for vehicle 500 is a predetermined value or less. The dense state is a state where the density is higher than the above-described predetermined value. Further, the entry notification operation is an operation for notifying moving objects 400 that vehicle 500 is likely to enter passing scheduled region 110 in the time period of the sparse state.

As a result, vehicle situation determination device 600 according to the present exemplary embodiment can cause vehicle 500 to perform the entry notification operation with suitable timing, and can improve the smooth movement of the vehicle across the sidewalk region.

Modification of the Present Exemplary Embodiment

Note that, the operation that is performed when the entry notification operation in entry determination unit 630 is determined as being performable is not limited to the above example. For example, entry determination unit 630 may output a control signal for instructing output of information indicating that the entry starting operation is performable under a condition that the entry starting operation is performable to vehicle 500. Specifically, entry determination unit 630 instructs, for example, an information output device (a human-machine (HMI)) such as a display or a speaker mounted in an interior of vehicle 500 to output an image, a text, a sound, or the like that urges a user to perform the entry starting operation.

Further, when determining that the entry notification operation is performable at a certain sparse time period, entry determination unit 630 may notify moving objects 400 that vehicle 500 is likely to perform the entry notification operation at the sparse time period. For example, entry determination unit 630 may instruct the information output device such as a display or a speaker mounted outside the interior of vehicle 500 to output an image, a text, or a sound for notifying moving objects 400 that the entry starting operation is likely to be started. Note that, entry determination unit 630 may transmit a control signal to mobile terminals such as smart phones owned by moving objects 400 via a public communication network or the like, and may cause the mobile terminals to output information such as a warning sound so as to perform the notification.

Further, the method for determining the coming of the sequential-sparse-and-dense time period in sparseness/denseness determination unit 620 is not limited to the above-described example. Sparseness/denseness determination unit 620 may postulate, for example, the moving directions and the moving speeds of moving objects 400 to estimate locations of moving objects 400 at each time from the arrangement of moving objects 400 at a certain time indicated by the sidewalk information, and may determine based on the estimated result whether the sequential-sparse-and-dense time period is coming.

Further, sparseness/denseness determination unit 620 does not always have to acquire specific or accurate sparse time period and dense time period in advance. For example, if the determination is made that the sparse time period and the dense time period following the sparse time period are likely to come, sparseness/denseness determination unit 620 starts monitoring whether the density of moving objects 400 in passing scheduled region 110 is larger than 0 and is less than the second threshold. Sparseness/denseness determination unit 620 then adopts the time period during which the density is larger than 0 and is less than the second threshold, as the sparse time period to be used for a condition of the determination whether the entry notification operation is performable.

Further, vehicle situation determination device 600 combines the above-described condition with another condition and may determine whether the sequential-sparse-and-dense time period comes and/or whether the entry notification operation is performable. For example, when a length of the sparse time period in the sequential-sparse-and-dense time period is less than or equal to a fourth threshold (for example, 5 seconds), entry determination unit 630 may determine that the entry notification operation is not performable at the sparse time period. On the contrary, vehicle situation determination device 600 does not have to use some of the plurality of above-described conditions such that the stopping time is not taken into consideration.

In addition, sidewalk region 100 that vehicle 500 aims to cross is not limited to the above example. Sidewalk region 100 may be any region in which some moving objects pass through and vehicle 500 is permitted to cross at any timing in a range where safety of vehicle 500 is ensured, and, for example, may be a pedestrian crossing. In addition, stopping region 300 where vehicle 500 is located before crossing sidewalk region 100 and roadway region 200 where vehicle 500 will be located after crossing are also not limited to the above-described parking lot and roadway.

Further, vehicle situation determination device 600 is not necessarily mounted in vehicle 500 that is a target of determination on whether the entry notification operation is performable, and, for example, may be disposed in a server on the internet. In this case, vehicle situation determination device 600 needs to include a communication unit for communicably connecting, by wireless communication or the like, with each of recognition device 510 and vehicle control device 520 mounted in vehicle 500 concerned. A part of the configuration of vehicle situation determination device 600 may be physically separated from the other parts of the configuration of the device. In this case, a plurality of the separated parts need to include communication units for mutual communication, respectively.

Summary of the Present Disclosure

The vehicle situation determination device of the present disclosure includes an input unit that receives a recognition result from a recognition device that recognizes one or a plurality of moving objects existing in a sidewalk region across which a vehicle tries to move, and a controller. The controller determines, based on the recognition result, that the vehicle is allowed to perform an entry notification operation for notifying the one or plurality of moving objects of a high possibility of entry of the vehicle into a passing scheduled region in a time period of a sparse state when a determination is made that a transition is made from the sparse state into a dense state, and outputs a predetermined control signal. The sparse state is a state where density of the one or plurality of moving objects existing in the passing scheduled region is lower than or equal to a predetermined value. The dense state is a state where the density is higher than the predetermined value.

In the vehicle situation determination device, the entry notification operation includes an entry starting operation for causing the vehicle to enter the passing scheduled region by a predetermined distance in the time period of the sparse state. The controller may output as the predetermined signal under a condition that the vehicle is allowed to perform the entry starting operation, at least one of a control signal for instructing the vehicle to perform the entry starting operation and a control signal for instructing the vehicle to output information indicating that the vehicle is allowed to perform the entry starting operation.

Further, in the vehicle situation determination device, the controller obtains a stopping time that is a length of a time during which the vehicle waits for entering the passing scheduled region through measurement or estimation because the moving objects exist in the passing scheduled region, and may determine that the vehicle is allowed to perform the entry notification operation under a condition that the obtained stopping time exceeds a first threshold.

Further, in the vehicle situation determination device, the stopping time may include at least one of a length of a time between a starting time of a sequential-sparse-and-dense time period and an end time of the sequential-sparse-and-dense time period, a length of a time between a waiting start time and a current time, and a length of a time between the waiting start time and the end time of the sequential-sparse-and-dense time period. The sequential-sparse-and-dense time period consists of a sparse time period that is the time period of the sparse state and a time period of the dense state following the sparse time period. The waiting start time is a time at which the vehicle starts waiting for entering the passing scheduled region.

Further, in the vehicle situation determination device, the recognition result includes sidewalk information indicating locations, moving directions, and moving speeds of the moving objects existing in the sidewalk region, the density is a number of the moving objects in the passing scheduled region per predetermined area, and the controller calculates the density at each time based on the sidewalk information. The controller then may determine as the time period of the dense state a time period during which the calculated density exceeds a second threshold, and may determine as the time period of the sparse state a time period during which the calculated density is more than or equal to a third threshold larger than 0 and less than or equal to the second threshold and which is followed by the dense time period.

Further, in the vehicle situation determination device, the density is a number of the moving objects in the passing scheduled region per predetermined area, and the controller detects as a dense region, based on the recognition result, a closed region where the density exceeds the second threshold and which is moving toward the passing scheduled region. The controller then determines as the time period of the dense state a time period during which the dense region passes through the passing scheduled region, and detects as a sparse region a closed region where the density is more than or equal to a third threshold larger than 0 and less than or equal to the second threshold and which moves together with the dense region continuously with the dense region on a side closer to the passing scheduled region. The controller may then determine as the time period of the sparse state a time period during which the sparse region passes through the passing scheduled region.

A vehicle situation determination method of the present disclosure includes receiving a recognition result from a recognition device that recognizes one or a plurality of moving objects existing in a sidewalk region across which a vehicle tries to move. Further, the method includes determining, based on the recognition result, that the vehicle is allowed to perform an entry notification operation for notifying the one or plurality of moving objects of a high possibility of entry of the vehicle into a passing scheduled region in a time period of a sparse state when a determination is made that a transition is made from the sparse state into a dense state, and outputting a predetermined control signal. The sparse state is a state where density of the one or plurality of moving objects existing in the passing scheduled region is lower than or equal to a predetermined value. The dense state is a state where the density is higher than the predetermined value.

A vehicle situation determination program of the present disclosure causes a computer to execute processing for receiving a recognition result from a recognition device that recognizes one or a plurality of moving objects existing in a sidewalk region across which a vehicle tries to move. The program causes the computer to determine, based on the recognition result, that the vehicle is allowed to perform an entry notification operation for notifying the one or plurality of moving objects of a high possibility of entry of the vehicle into a passing scheduled region in a time period of a sparse state when a determination is made that a transition is made from the sparse state into a dense state and outputs a predetermined control signal. The sparse state is a state where density of the one or plurality of moving objects existing in the passing scheduled region is lower than or equal to a predetermined value. The dense state is a state where the density is higher than the predetermined value.

INDUSTRIAL APPLICABILITY

The vehicle situation determination device, the vehicle situation determination method, and the vehicle situation determination program of the present disclosure are useful as a vehicle situation determination device that can improve smooth movement of a vehicle across a sidewalk region, a vehicle situation determination method, and a vehicle situation determination program.

REFERENCE MARKS IN THE DRAWINGS

100: sidewalk region
200: roadway region
300: stopping region
400: moving object
500: vehicle
510: recognition device
520: vehicle control device
600: vehicle situation determination device
610: information acquisition unit
620: sparseness/denseness determination unit
630: entry determination unit

The invention claimed is:

1. A vehicle situation determination method comprising:
  receiving a recognition result from a sensor that recognizes one or a plurality of moving objects existing in a sidewalk region across which a vehicle tries to move;
  determining, based on the recognition result, that the vehicle is allowed to perform an entry notification operation for notifying the one or plurality of moving objects of a high possibility of entry of the vehicle into a passing scheduled region in a time period of a sparse state when a determination is made that a transition is made from the sparse state into a dense state, the entry notification operation including an entry starting operation for causing the vehicle to enter the passing scheduled region by a predetermined distance in the time period of the sparse state; and outputting, as a predetermined control signal under a condition that the vehicle is allowed to perform the entry starting operation, at least one of a control signal for instructing the vehicle to perform the entry starting operation and a control signal for instructing the vehicle to output information indicating that the vehicle is allowed to perform the entry starting operation, wherein the sparse state being a state where density of the one or plurality of moving objects existing in the passing scheduled region is lower than or equal to a predetermined value, and the dense state being a state where the density is higher than the predetermined value.

2. A vehicle situation determination device comprising:
a central processing unit (CPU) that
 receives information about a recognition result of recognizing one or a plurality of moving objects existing in a sidewalk region ahead of a vehicle in an advancing direction; and
 determines, based on the recognition result, that the vehicle is allowed to enter a passing scheduled region in a time period of a sparse state when a transition is made from the sparse state into a dense state, the sparse state being a state where density of the one or plurality of moving objects existing in the passing scheduled region is lower than or equal to a predetermined value, the dense state being a state where the density is higher than the predetermined value, wherein
 when determining that the vehicle is allowed to enter the passing scheduled region, the CPU determines that the vehicle is allowed to perform an entry notification operation for notifying the one or plurality of moving objects,
 the entry notification operation includes an entry starting operation for causing the vehicle to enter the passing scheduled region by a predetermined distance in the time period of the sparse state, and
 the CPU outputs, as a predetermined signal under a condition that the vehicle is allowed to perform the entry starting operation, at least one of a control signal for instructing the vehicle to perform the entry starting operation and a control signal for instructing the vehicle to output information indicating that the vehicle is allowed to perform the entry starting operation.

3. The vehicle situation determination device according to claim 2, wherein
 the CPU obtains a stopping time that is a length of a time during which the vehicle waits for entering the passing scheduled region through measurement or estimation because the one or plurality of moving objects exists in the passing scheduled region, and determines that the vehicle is allowed to perform the entry notification operation under a condition that the obtained stopping time exceeds a first threshold.

4. The vehicle situation determination device according to claim 3, wherein
 the stopping time includes at least one of a length of a time between a starting time of a sequential-sparse-and-dense time period and an end time of the sequential-sparse-and-dense time period, a length of a time between a waiting start time and a current time, and a length of a time between the waiting start time and the end time of the sequential-sparse-and-dense time period, the sequential-sparse-and-dense time period consisting of a sparse time period that is the time period of the sparse state and a time period of the dense state following the sparse time period, the waiting start time being a time at which the vehicle starts waiting for entering the passing scheduled region.

5. The vehicle situation determination device according to claim 2, wherein
 the recognition result includes sidewalk information indicating locations, moving directions, and moving speeds of the one or plurality of moving objects existing in the sidewalk region,
 the density is a number of the one or plurality of moving objects in the passing scheduled region per predetermined area, and
 the CPU
 calculates the density at each time based on the sidewalk information, determines as the time period of the dense state a time period during which the calculated density exceeds a second threshold, and determines as the time period of the sparse state a time period during which the calculated density is more than or equal to a third threshold larger than 0 and less than or equal to the second threshold and which is followed by the dense time period.

6. The vehicle situation determination device according to claim 2, wherein
 the density is a number of the one or plurality of moving objects in the passing scheduled region per predetermined area, and
 the CPU
 detects as a dense region, based on the recognition result, a closed region where the density exceeds a second threshold and which is moving toward the passing scheduled region, determines as the time period of the dense state a time period during which the dense region passes through the passing scheduled region, detects as a sparse region a closed region where the density is more than or equal to a third threshold larger than 0 and less than or equal to the second threshold and which moves together with the dense region continuously with the dense region on a side closer to the passing scheduled region, and determines as the time period of the sparse state a time period during which the sparse region passes through the passing scheduled region.

7. A vehicle situation determination device comprising:
a central processing unit (CPU) that
receives information about a recognition result of recognizing one or a plurality of moving objects existing in a sidewalk region ahead of a vehicle in an advancing direction; and
 determines, based on the recognition result, that the vehicle is allowed to enter a passing scheduled region by a predetermined distance in a time period of a sparse state when a transition is made from the sparse state into a dense state, the sparse state being a state where density of the one or plurality of moving objects existing in the passing scheduled region is lower than or equal to a predetermined value, the dense state being a state where the density is higher than the predetermined value, wherein
 the CPU outputs as a predetermined signal under a condition that the vehicle is allowed to enter the passing scheduled region by a predetermined distance in the time period of the sparse state, at least one of a control signal for instructing the vehicle to enter the passing scheduled region by the predetermined distance in the time period of the sparse state and a control signal for instructing the vehicle to output information indicating that the vehicle is allowed to enter the passing scheduled region by the predetermined distance in the time period of the sparse state.

8. The vehicle situation determination device according to claim 2, wherein
the CPU outputs a control signal for instructing the vehicle to stop after the vehicle enters the passing scheduled region by the predetermined distance.

9. The vehicle situation determination method according to claim 1, wherein
the CPU outputs a control signal for instructing the vehicle to stop after the vehicle enters the passing scheduled region by the predetermined distance.

10. The vehicle situation determination device according to claim 7, wherein
the CPU outputs a control signal for instructing the vehicle to stop after the vehicle enters the passing scheduled region by the predetermined distance.

* * * * *